United States Patent
Ma

(10) Patent No.: US 11,569,723 B2
(45) Date of Patent: Jan. 31, 2023

(54) VIBRATION MOTOR WITH GUIDE RAIL AND ROLLING MEMBERS AND STOPPING MAGNET

(71) Applicant: AAC Technologies Pte. Ltd., Singapore (SG)

(72) Inventor: Jie Ma, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 303 days.

(21) Appl. No.: 16/994,687

(22) Filed: Aug. 17, 2020

(65) Prior Publication Data

US 2020/0412226 A1   Dec. 31, 2020

Related U.S. Application Data

(63) Continuation of application No. PCT/CN2019/094064, filed on Jun. 30, 2019.

(51) Int. Cl.
*H02K 33/18* (2006.01)
*G08B 6/00* (2006.01)

(52) U.S. Cl.
CPC .............. *H02K 33/18* (2013.01); *G08B 6/00* (2013.01)

(58) Field of Classification Search
CPC ........ H02K 33/00; H02K 33/18; H02K 33/16; H02K 35/00; H02K 7/34; H02K 7/1876
USPC ..................................................... 310/15, 28
See application file for complete search history.

(56) References Cited

U.S. PATENT DOCUMENTS

| | | | | |
|---|---|---|---|---|
| 10,038,362 B2* | 7/2018 | Wang | ..... | H02K 33/16 |
| 10,079,530 B2* | 9/2018 | Mao | ..... | H02K 33/00 |
| 10,250,114 B2* | 4/2019 | Wang | ..... | H02K 33/16 |
| 2006/0044093 A1* | 3/2006 | Ohta | ..... | H02K 99/20 |
| | | | | 335/220 |
| 2010/0302752 A1* | 12/2010 | An | ..... | H02K 33/06 |
| | | | | 361/807 |
| 2011/0001365 A1* | 1/2011 | Park | ..... | H02K 33/16 |
| | | | | 310/17 |
| 2013/0200732 A1* | 8/2013 | Jun | ..... | H02K 33/16 |
| | | | | 310/25 |
| 2014/0054983 A1* | 2/2014 | Moon | ..... | H02K 33/16 |
| | | | | 310/28 |
| 2016/0226360 A1* | 8/2016 | Wang | ..... | H02K 33/16 |
| 2016/0365784 A1* | 12/2016 | Mao | ..... | H02K 33/00 |
| 2017/0033655 A1* | 2/2017 | Wang | ..... | H02K 33/16 |
| 2017/0033658 A1* | 2/2017 | Wang | ..... | H02K 33/16 |

(Continued)

FOREIGN PATENT DOCUMENTS

CN   111404346 B  *  6/2021  ............. H02K 1/02
JP   2017029971 A  *  2/2017  ............. H02K 33/16

*Primary Examiner* — Maged M Almawri
(74) *Attorney, Agent, or Firm* — W&G Law Group

(57) ABSTRACT

Provided is a vibration motor, including: a housing having a receiving space; a vibrator received in the receiving space; and a coil configured to drive the vibrator to reciprocate; and a guide rail received in the receiving space and fixed to the housing. The vibrator includes a rolling friction portion corresponding to the guide rail, and the rolling friction portion comprises a mass block spaced apart from and opposite to the guide rail, and a plurality of rolling members connected between the mass block and the guide rail in a slidable way. Compared with the related art, the vibration motor provided by the present invention can effectively reduce a friction force and improve a performance thereof.

10 Claims, 4 Drawing Sheets

(56) References Cited

U.S. PATENT DOCUMENTS

| | | | |
|---|---|---|---|
| 2017/0033664 A1* | 2/2017 | Xu | H02K 33/18 |
| 2017/0179804 A1* | 6/2017 | Xu | H02K 33/16 |
| 2017/0250596 A1* | 8/2017 | Son | H02K 1/34 |
| 2017/0279343 A1* | 9/2017 | Katada | H02K 5/16 |
| 2017/0288523 A1* | 10/2017 | Katada | H02P 25/032 |
| 2018/0297061 A1* | 10/2018 | Mao | H02K 5/04 |
| 2018/0297070 A1* | 10/2018 | Xu | B06B 1/045 |
| 2019/0238039 A1* | 8/2019 | Tsuchihashi | B06B 1/04 |
| 2019/0238041 A1* | 8/2019 | Tsuchihashi | F16F 9/30 |
| 2022/0103053 A1* | 3/2022 | Ho | H04N 5/2254 |

* cited by examiner

US 11,569,723 B2

VIBRATION MOTOR WITH GUIDE RAIL AND ROLLING MEMBERS AND STOPPING MAGNET

TECHNICAL FIELD

The present invention relates to the field of vibration motors, and particularly, to a vibration motor having a low friction coefficient and low noise.

BACKGROUND

A vibration motor is a component that converts electrical energy into mechanical energy by using a mechanism of generation of an electromagnetic force. The vibration motor is usually installed in a portable mobile device to generate a vibration feedback, such as a vibration feedback of a mobile phone or a game machine.

In the related art, the vibration motor includes a case having a receiving space, a vibrator received in the receiving space, and a coil configured to drive the vibrator to reciprocate.

However, the vibrator of the vibration motor known in the related art is in sliding contact with other components of the vibration motor during vibration, which may result in a great friction force between the vibrator and other components. In addition, during the friction process, friction noise will be generated, thereby greatly reducing the user experience of using the portable mobile device.

Therefore, it is necessary to provide an improved vibration motor to solve the problem described above.

SUMMARY

The problems in the related art are in that the vibrator of the vibration motor is in sliding contact with other components of the vibration motor during vibration, which may result in great friction force and friction noise to negatively affect the user experience. In view of the technical problems, the present invention provides a vibration motor having a low friction coefficient and low noise.

A vibration motor includes a housing having a receiving space; a vibrator received in the receiving space; a coil configured to drive the vibrator to reciprocate; and a guide rail received in the receiving space and fixed to the housing. The vibrator includes a rolling friction portion corresponding to the guide rail, and the rolling friction portion comprises a mass block spaced apart from and opposite to the guide rail, and a plurality of rolling members connected between the mass block and the guide rail in a slidable way.

As an improvement, the housing comprises a main body portion having a cylindrical shape and two end covers spaced apart from and opposite to each other, and the two end covers respectively cover openings at two ends of the main body portion to define the receiving space; the guide rail has a hollow structure and surrounds a sliding space, a cross-section of the guide rail along a direction perpendicular to a vibrating direction has the same shape as a cross-section of the main body portion along the direction perpendicular to the vibrating direction, and the mass block is located in the sliding space.

As an improvement, the mass block comprises a sliding surface spaced apart from and opposite to the guide rail and a plurality of recesses each formed by recessing from the sliding surface in a direction facing away from the guide rail; and each of the plurality of rolling members is at least partially received in a corresponding one of the plurality of recesses.

As an improvement, each of the plurality of rolling members is a ball, and the plurality of recesses is parallel to the vibrating direction.

As an improvement, the mass block further comprises a side surface connected to the sliding surface and perpendicular to the vibrating direction, the side surface faces towards one of the two end covers, the plurality of recesses extends to the side surface; the vibration motor further comprises a stopping sheet affixed to the side surface, and a projection of each of the plurality of recesses in the direction perpendicular to the vibrating direction at least partially overlaps a projection of the stopping sheet in the direction perpendicular to the vibrating direction.

As an improvement, a projection of the mass block in the direction perpendicular to the vibrating direction has a rectangular shape; the sliding surface comprises two first surfaces parallel to and spaced apart from each other, and two second surfaces connecting the first surfaces and parallel to and spaced apart from each other; and the plurality of recesses is formed by recessing from the two first surfaces and/or the two second surfaces.

As an improvement, the vibration motor further includes a stopper fixed to one of the two end covers, wherein the stopper comprises a first magnet fixed to the one end cover, and a magnetic conductive sheet fixed to a surface of the first magnet close to the mass block.

As an improvement, the vibrator further comprises an iron core located in a middle position thereof and second magnets fixed to two ends of the iron core; the iron core is located in a space surrounded by the coil and is spaced apart from the coil; and each of the second magnets is arranged between the rolling friction portion and the iron core.

As an improvement, each of the second magnets has a hollow structure, and comprises a magnet body portion and an accommodating space surrounded by the magnet body portion; the iron core comprises an iron core body portion and an iron core extending portion extending from the iron core body portion towards the rolling friction portion; and the iron core extending portion is received in the accommodating space.

As an improvement, the rolling friction portion further comprises a mass block extending portion extending from the mass block towards the iron core, and the mass block extending portion is received in the accommodating space.

As an improvement, the second magnets located at the two ends of the iron core have opposite magnetic poles.

As an improvement, each of the second magnets and the first magnet adjacent to the second magnet have a same magnetic pole.

As an improvement, a winding direction of the coil is parallel to a vibrating direction.

Compared with the related art, in the vibration motor according to the present invention, the rolling friction portion and the guide rail are provided, and the rolling friction portion includes the mass block spaced apart from the guide rail and a number of rolling members connected between the mass block and the guide rail in a slidable way, thereby providing the rolling friction between the vibrator and the case through the rolling members. The friction force between the vibrator and the guide rail is relatively low, and thus the noise is low, which effectively improves performance of the vibration motor.

BRIEF DESCRIPTION OF DRAWINGS

In order to more clearly illustrate technical solutions in embodiments of the present invention or in the related art, the accompanying drawings used in the embodiments and in the related art are briefly introduced as follows. It should be noted that the drawings described as follows are merely some of the embodiments of the present invention, and other drawings can also be acquired by those skilled in the art without paying creative efforts.

DESCRIPTION OF EMBODIMENTS

The technical solutions in the embodiments of the present invention are described in detail with reference to the accompanying drawings. It should be noted that, the described embodiments are merely exemplary embodiments of the present invention, which shall not be interpreted as limitations to the present invention. Other embodiments, which are obtained by those skilled in the art without paying creative efforts according to the embodiments of the present invention, shall fall within the scope of the present invention.

Figure 1:
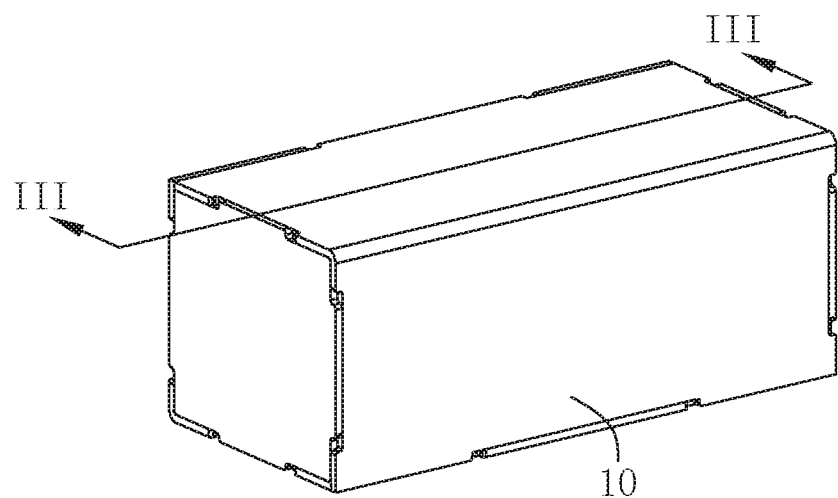
FIG. 1 is a schematic perspective view of a structure of a vibration motor according to the present invention.
Figure 2:
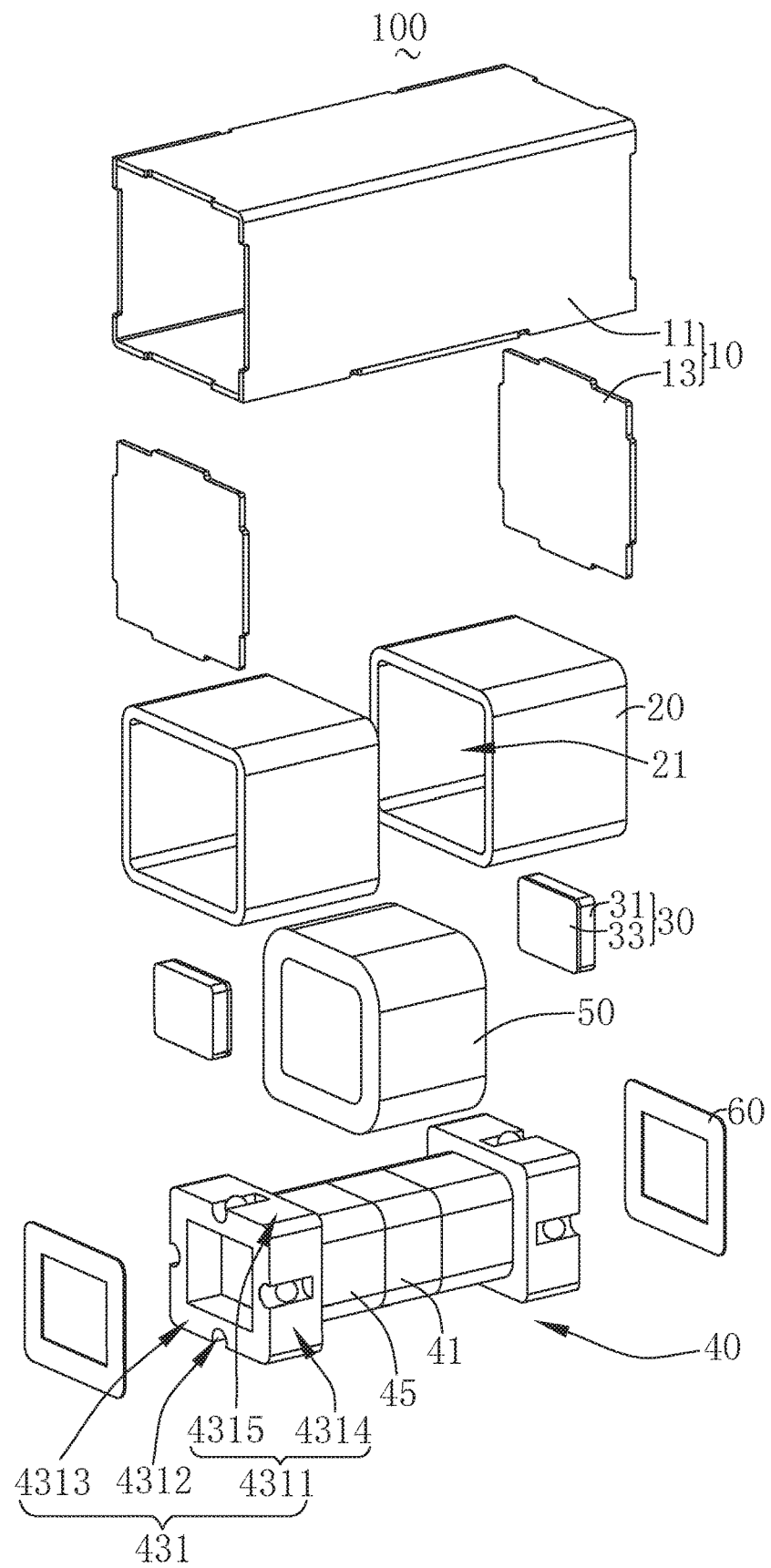
FIG. 2 is a schematic exploded view of the structure of the vibration motor shown in FIG. 1.
Figure 3:
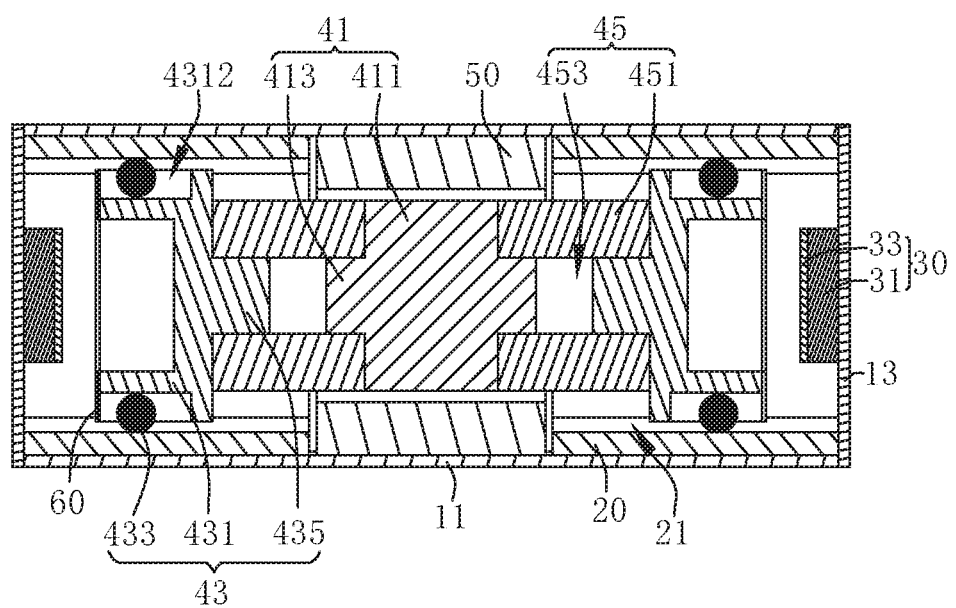
FIG. 3 is a cross-sectional view along shown in FIG. 1.

With reference to FIG. 1 to FIG. 3, the present invention provides a vibration motor 100, which includes a housing 10 having a receiving space, a guide rail 20 and a stopper 30 that are received in the receiving space and fixed to the housing 10, a vibrator 40 received in the receiving space, a coil 50 configured to drive the vibrator 40 to reciprocate, and a stopping sheet 60 fixed to the vibrator 40.

The housing 10 includes a main body portion 11 having a cylindrical shape, and two end covers 13 opposite to and spaced apart from each other. The two end covers 13 respectively cover openings at two ends of the main body portion 11 to define the receiving space. The vibrator 40 is provided along an extending direction of the main body portion 11, i.e., a direction from one end cover 111 to the other end cover 111, and the vibrator 50 can vibrate along the extending direction of the main body portion 11.

The guide rail 20 is formed as a hollow structure and encloses a sliding space 21. A cross-section of the guide rail 20 along a direction perpendicular to a vibrating direction and a cross-section of the main body portion 11 along the direction perpendicular to the vibrating direction have the same shape. In this embodiment, for example, two guide rails 20 are provided, and the two guide rails 20 are respectively located at two ends of the main body portion 11.

The stopper 30 is directly opposite to the vibrator 40. The stopper 30 includes a first magnet 31 fixed to the end cover 13, and a magnetic conductive sheet 33 fixed to a surface of the first magnet 31 close to the vibrator 40. The stopper 30 is configured to supply a repulsive force to the vibrator 40, so as to prevent the vibrator 40 from hitting the end cover 13. In an example, two stoppers 30 are provided, and the two stoppers 30 are respectively provided at the two end covers 13. By respectively providing the two stoppers 30 at the two end covers 13, the repulsive force applied to the vibrator 40 can be increased, thereby improving a vibrating effect of the vibration motor 100.

The vibrator 40 includes an iron core 41 located in the middle, a rolling friction portion 43 spaced apart from the iron core 41, and a second magnet 45 located between the iron core 41 and the rolling friction portion 43. Two rolling friction portions 43 and two second magnets 45 are provided. The two rolling friction portions 43 are symmetrical to each other with respect to the iron core 41, and the two rolling friction portions 43 are respectively located at sides close the two end covers 13. The two second magnets 45 are fixed to two ends of the iron core 41, respectively.

The iron core 41 includes an iron core body portion 411, and an iron core extending portion 413 extending from the iron core body portion 411 towards the rolling friction portion 43. Two iron core extending portions 413 are provided, and the two iron core extending portions 413 respectively extends from the iron core body portion 411 towards the two rolling friction portions 43.

The second magnet 45 has a hollow structure. The second magnet 45 includes a magnet body portion 451 and an accommodating space 453 surrounded by the magnet body portion 451. Each of the two iron core extending portions 413 is received in the accommodating space 453 of a corresponding one of the two second magnets 45, thereby improving a fixation and connection between the iron core 41 and the second magnet 45.

The two rolling friction portions 43 are arranged corresponding to the two guide rails 20, respectively. The rolling friction portion 43 includes a mass block 431 spaced apart from the guide rail 20, a number of rolling members 433 connected between the mass block 431 and the guide rail 20 in a slidable way, and a mass block extending portion 435 extending from the mass block 431 towards the iron core 41. The mass block extending portion 435 and the mass block 431 are formed into one piece. The rolling member 433 provided between the mass block 431 and the guide rail 20 results in formation of rolling friction between the vibrator 40 and the guide rail 20, which reduces the friction force between the vibrator 40 and the guide rail 20 and the noise thereof when the vibrator 40 vibrates, thereby effectively improving a performance of the vibration motor 100. Meanwhile, by providing the mass block 431, a mass of the vibrator 40 is increased, thereby effectively improving the performance of the vibration motor 100.

The mass block 431 is located in the sliding space 21, and the mass block 431 includes a sliding surface 4311 spaced apart from the guide rail 20, a recess 4312 formed by recessing from the sliding surface 4311 in a direction facing away from the guide rail, and a side surface 4313 connected to the sliding surface 4311 and perpendicular to the vibrating direction. The side surface 4313 faces towards the end cover 13, and the recess 4312 extends to the side surface 4313.

The rolling member 433 is at least partially received in the recess 4312. The stopping sheet 60 is affixed to the side surface 4313, and a projection of the recess 4312 in the direction perpendicular to the vibrating direction at least partially overlaps the stopping sheet 60. By affixing the stopping sheet 60 to the side surface 4313, a position of the rolling member 433 can be well restricted, thereby preventing the rolling member 433 from falling and improving stability of the vibration motor 100.

A projection of the mass block 431 in the direction perpendicular to the vibrating direction has a rectangular shape. The sliding surface 4311 includes two first surfaces 4314 parallel to and spaced apart from each other, and two second surfaces 4315 that connect the two first surfaces 4314 and are parallel to and spaced apart from each other. The recess 4312 is formed by recessing from the first surface 4314 and/or from the second surface 4315. For example, in this embodiment, the first surfaces 4314 and the second surfaces 4315 are each provided with the recess 4312. That is, in this embodiment, each mass block 431 is provided with four recesses 4312. Correspondingly, each of the rolling friction portions 43 is provided with four rolling members 433, and the four rolling members 433 are received in the four recesses 4312, respectively.

In this embodiment, the guide rail 20 has a hollow rectangular structure. The Four recesses 4312 correspond to four walls of the guide rail 20, respectively, and the four rolling members 433 correspond to four walls of the guide rail 20, respectively. In this way, the mass block 431 is completely spaced apart from the guide rail 20, and the friction force can be effectively reduced through the rolling members 433. It should be understood that, in other embodiments, the guide rail 20 may be formed in any other shape, and a number of the rolling member 433 may be different as needed, as long as the rolling member 433 is provided between the guide rail 20 and the mass block 431 to reduce the friction force and to separate the mass block 431 from the guide rail 20.

In this embodiment, the rolling member 433 is a spherical ball, and the recess 4312 is parallel to the vibrating direction. It should be noted that, in other embodiments, the recess 4312 may also be perpendicular to the vibrating direction, the rolling member 433 may be a cylindrical rolling member, and the cylindrical rolling member includes two top surfaces spaced apart from each other and a side surface connecting the two top surfaces. The side surface abuts against the mass block 431 and the guide rail 20, thereby forming the rolling friction.

The mass block extending portion 435 is received in the accommodating space 453 to improve the connection and fixation between the mass block 431 and the second magnet 45.

The coil 50 has a hollow structure and is fixed into the main body portion 11. The guide rail 20 and the coil 50 are sequentially arranged along an extending direction of the main body portion 11. The coil 50 is located at a middle position of the main body portion 11, and the two guide rails 20 are respectively located at two ends of the main body portion 11 and are arranged symmetrically to each other with respect to the coil 50. For example, a winding direction of the coil 50 is parallel to the vibrating direction.

Two stopping sheets 60 are provided in one-to-one correspondence to the two mass blocks 431.

Figure 4:
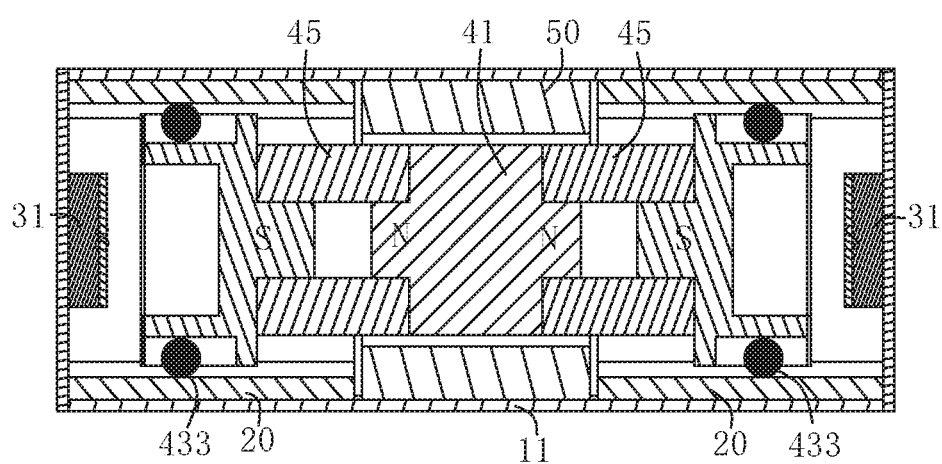
FIG. 4 is a schematic diagram illustrating magnetic pole distribution of magnetic poles of the structure shown in FIG. 3.

With reference to FIG. 4, the second magnets 45 located at two ends of the iron core 41 have opposite magnetic poles, and the second magnet 45 and the first magnet 31 have the same magnetic pole. For example, in this embodiment, a side of the first magnet 31 close to the second magnet 45 is S polarity, and a side of the second magnet 45 close to the first magnet 31 is S polarity, and the other side of the second magnet 45 facing away from the first magnet 31 is N polarity.

The magnetic induction lines of the two second magnets 45 are emitted outward through the iron core 41 and interact with the energized coil 50 to generate a driving force, with which the vibrator 40 is driven to reciprocate along an extending direction of the main body portion 11. The magnetic pole of the first magnet 31 are opposite to the magnetic pole of the magnetic poles of the second magnet 45, so as to form a repulsive force, which provides the required support stiffness of the vibrator 40 in the extending direction of the main body portion 11. Since the first magnet 31 cannot provide support stiffness to the vibrator 40 in other directions, the vibrator 40 may be in contact with the guide rail 20, and the rolling member 433 is arranged to provide the rolling friction between the vibrator 40 and the guide rail 20, thereby effectively reducing the friction force and thus reducing the noise. In this way, the performance of the vibration motor 100 can be improved. The vibration motor 100 provided by the present invention fully utilizes the space of the vibrator 40, without requiring a large space for installing the bearings. Moreover, the vibrator 40 has a greater mass, which also improves the performance. Meanwhile, the rolling friction portion 43 has a relatively simple structure, avoiding a complicated structure of the bearings.

Compared with the related art, in the vibration motor according to the present invention, the rolling friction portion and the guide rail are provided, and the rolling friction portion includes the mass block spaced apart from the guide rail and a number of rolling members connected between the mass block and the guide rail in a slidable way, thereby providing the rolling friction between the vibrator and the case through the rolling members. The friction force between the vibrator and the guide rail is relatively low, and thus the noise is low, which effectively improves performance of the vibration motor.

The above description merely illustrates some embodiments of the present invention. It should be noted that those skilled in the art may make modifications without departing from the concept of the present invention, and all these modifications shall fall into the protection scope of the present invention.

What is claimed is:

1. A vibration motor, comprising:
a housing having a receiving space;
a vibrator received in the receiving space;
a coil configured to drive the vibrator to reciprocate; and
a guide rail received in the receiving space and fixed to the housing,
wherein the vibrator comprises a rolling friction portion corresponding to the guide rail, and the rolling friction portion comprises a mass block spaced apart from and opposite to the guide rail, and a plurality of rolling members connected between the mass block and the guide rail in a slidable way;
wherein the housing comprises a main body portion having a cylindrical shape and two end covers spaced apart from and opposite to each other, and the two end covers respectively cover openings at two ends of the main body portion to define the receiving space;
wherein the guide rail has a hollow structure and surrounds a sliding space, a cross-section of the guide rail along a direction perpendicular to a vibrating direction has the same shape as a cross-section of the main body portion along the direction perpendicular to the vibrating direction, and the mass block is located in the sliding space;
wherein the mass block comprises a sliding surface spaced apart from and opposite to the guide rail and a plurality of recesses each formed by recessing from the sliding surface in a direction facing away from the guide rail; and each of the plurality of rolling members is at least partially received in a corresponding one of the plurality of recesses;
wherein a projection of the mass block in the direction perpendicular to the vibrating direction has a rectangular shape;
the sliding surface comprises two first surfaces parallel to and spaced apart from each other, and two second surfaces connecting the first surfaces and parallel to and spaced apart from each other; and the plurality of recesses is formed by recessing from the two first surfaces and/or the two second surfaces.

2. The vibration motor as described in claim 1, wherein a winding direction of the coil is parallel to a vibrating direction.

3. The vibration motor as described in claim 1, wherein each of the plurality of rolling members is a ball, and the plurality of recesses is parallel to the vibrating direction.

4. The vibration motor as described in claim 3, wherein the mass block further comprises a side surface connected to the sliding surface and perpendicular to the vibrating direction, the side surface faces towards one of the two end covers, the plurality of recesses extends to the side surface,
wherein the vibration motor further comprises a stopping sheet affixed to the side surface, and a projection of each of the plurality of recesses in the direction perpendicular to the vibrating direction at least partially overlaps a projection of the stopping sheet in the direction perpendicular to the vibrating direction.

5. The vibration motor as described in claim 1, further comprising a stopper fixed to one of the two end covers,
wherein the stopper comprises a first magnet fixed to the one end cover, and a magnetic conductive sheet fixed to a surface of the first magnet close to the mass block.

6. The vibration motor as described in claim 5, wherein the vibrator further comprises an iron core located in a middle position thereof and second magnets fixed to two ends of the iron core; the iron core is located in a space surrounded by the coil and is spaced apart from the coil; and each of the second magnets is arranged between the rolling friction portion and the iron core.

7. The vibration motor as described in claim 6, wherein the second magnets located at the two ends of the iron core have opposite magnetic poles.

8. The vibration motor as described in claim 6, wherein each of the second magnets and the first magnet adjacent to the second magnet have a same magnetic pole.

9. The vibration motor as described in claim 6, wherein each of the second magnets has a hollow structure, and comprises a magnet body portion and an accommodating space surrounded by the magnet body portion;
wherein the iron core comprises an iron core body portion and an iron core extending portion extending from the iron core body portion towards the rolling friction portion; and
wherein the iron core extending portion is received in the accommodating space.

10. The vibration motor as described in claim 9, wherein the rolling friction portion further comprises a mass block extending portion extending from the mass block towards the iron core, and the mass block extending portion is received in the accommodating space.

* * * * *